United States Patent
Liu et al.

(10) Patent No.: US 9,066,158 B2
(45) Date of Patent: Jun. 23, 2015

(54) ADAPTIVE JOINT SOURCE AND CHANNEL CODING SCHEME FOR H.264 VIDEO MULTICASTING OVER WIRELESS NETWORKS

(75) Inventors: Zhengye Liu, Brooklyn, NY (US); Hang Liu, Yardley, PA (US); Yao Wang, Matawan, NJ (US)

(73) Assignee: Thomson Licensing, Issy Les Moulineaux (FR)

( * ) Notice: Subject to any disclaimer, the term of this patent is extended or adjusted under 35 U.S.C. 154(b) by 600 days.

(21) Appl. No.: 13/297,942

(22) Filed: Nov. 16, 2011

(65) Prior Publication Data

US 2012/0093017 A1      Apr. 19, 2012

Related U.S. Application Data (62) Division of application No. 12/086,458, filed as application No. PCT/US2005/045550 on Dec. 15, 2005, now Pat. No. 8,089,892.

(51) Int. Cl.
*H04N 21/60*  (2011.01)
*H04N 21/845*  (2011.01)
(Continued)

(52) U.S. Cl.
CPC ....... *H04N 21/8451* (2013.01); *H04N 21/2383* (2013.01); *H04N 21/2385* (2013.01);
(Continued)

(58) Field of Classification Search
CPC .......... H04N 21/2383; H04N 21/2385; H04N 21/2402; H04N 21/2662; H04N 21/44209; H04N 21/6405; H04N 21/658; H04N 21/8451
USPC ........ 370/252, 253, 468; 375/240.01, 240.02, 375/240.03, 240.05, 240.07
See application file for complete search history.

(56) References Cited

U.S. PATENT DOCUMENTS

| | | | |
|---|---|---|---|
| 6,574,218 B1 | 6/2003 | Cooklev | |
| 2004/0057383 A1 | 3/2004 | Tseng et al. | |
| 2005/0018635 A1* | 1/2005 | Proctor, Jr. | 370/335 |
| 2005/0030887 A1* | 2/2005 | Jacobsen et al. | 370/208 |
| 2006/0062326 A1* | 3/2006 | Hoffmann et al. | 375/298 |
| 2008/0259813 A1 | 10/2008 | Matta et al. | |

FOREIGN PATENT DOCUMENTS

| | | |
|---|---|---|
| EP | 1478126 A1 | 11/2004 |
| KR | 20040073628 A | 8/2004 |
| WO | 0122676 A1 | 3/2001 |

OTHER PUBLICATIONS

Kim et al., "Mobile Network Estimation", Proceedings of the Seventh Annual Conference on Mobile Computing and Networking, Jun. 1, 2011.

(Continued)

*Primary Examiner* — Pao Sinkantarakorn
(74) *Attorney, Agent, or Firm* — Robert D. Shedd; Jeffrey M. Navon; Catherine A. Cooper (57) ABSTRACT

An invention is described including calculating a real packet loss rate in a time slot at the end of the time slot, estimating average packet loss rate for a subsequent time slot, estimating variance of packet loss rate for the subsequent time slot and estimating the packet loss rate for the subsequent time slot. An invention is also described for dynamically allocating available bandwidth for video multicast including selecting an intra-frame rate, determining a packet loss rate threshold, receiving user topology information, receiving channel conditions for each user, determining an optimal operation point for encoding and transmitting video frames in a subsequent time slot, adapting dynamically quantization parameters and a forward error correction code rate, encoding the video frames using the quantization parameters and applying forward error correction code with the forward error correction code rate to data packets of the video frames to generate forward error correction packets.

14 Claims, 9 Drawing Sheets

(51) Int. Cl.
  *H04N 21/2383* (2011.01)
  *H04N 21/2385* (2011.01)
  *H04N 21/24* (2011.01)
  *H04N 21/2662* (2011.01)
  *H04N 21/442* (2011.01)
  *H04N 21/6405* (2011.01)
  *H04N 21/658* (2011.01)

(52) U.S. Cl.
  CPC ....... *H04N21/2402* (2013.01); *H04N 21/2662* (2013.01); *H04N 21/44209* (2013.01); *H04N 21/6405* (2013.01); *H04N 21/658* (2013.01)

(56) References Cited

OTHER PUBLICATIONS

Kung et al., "Adaptive Joint Source/Channel Coding for Robust Video Transmission", 2002 IEEE, 2002.
Yu et al., "A Highly Efficient, Low Delay Architecture for Transporting H.264 Video Over Wireless Channel", Science Direct, Signal Processing Image Communication 19, 2004, pp. 369-385.
Zhai et al., "How Well Can the IEEE 802.11 Wireless LAN Support Quality of Service?", IEEE Transactions on Wireless Communications, vol. 4, No. 6, Nov. 2005, pp. 3084-3094.

* cited by examiner

ADAPTIVE JOINT SOURCE AND CHANNEL CODING SCHEME FOR H.264 VIDEO MULTICASTING OVER WIRELESS NETWORKS

This application is a divisional of co-pending U.S. application Ser. No. 12/086,458, filed Jun. 12, 2008, herein incorporated by reference.

This application claims the benefit, under 35 U.S.C. §365 of International Application PCT/US2005/045550, filed Dec. 15, 2005, which was published in accordance with PCT Article 21(2) on Jun. 21, 2007 in English.

FIELD OF THE INVENTION

The present invention relates to multicasting over a wireless network and in particular, to an adaptive joint source and channel coding method and apparatus.

BACKGROUND OF THE INVENTION

Recent advances have given rise to the dramatic increase of channel bandwidth in wireless networks, for example, an IEEE 802.11 wireless local area network (WLAN). While current wireless network physical layer technologies such as IEEE 802.11a and 802.11g operate at 54 Mbps, new standards that operate at speeds up to 630 Mbps are under investigation. Meanwhile, new video coding standards such as H.264 offer much higher compression efficiency than previous technologies. Moreover, emerging WLAN media access control (MAC) technologies such as IEEE 802.11e allow traffic prioritization, giving delay sensitive video traffic a priority higher than data traffic in accessing network resources so that the quality of service (QoS) for video traffic and data traffic can be simultaneously supported. All the above have made the streaming of high-quality video over a wireless network possible.

Video multicasting over wireless networks enables the distribution of live or pre-recorded programs to many receivers efficiently. An example of such an application is to redistribute TV programs or location specific information in hot spots such as airports, cafes, hotels, shopping malls, and etc. Users can watch their favorite TV programs on mobile devices while browsing the Internet. For enterprise applications, an example is multicasting video classes or university announcements over wireless networks in campus. Other examples include movie previews outside cinemas, replay of the most important scenes in a football stadium etc.

However, for wireless networks, the transmission error rate is usually high due to the factors such as channel fading and interference. For multicast, the IEEE 802.11 link layer does not perform retransmission of lost packets. A data packet/frame is discarded at the receiving media access control (MAC) layer in the event of an error. Hence, the required quality of service (QoS) may not be guaranteed to the users without good channel conditions. Therefore, additional error protection mechanisms are required to provide reliable services for users and allow adaptation to varying user topology and varying channel conditions of multiple users in a multicast service area.

To achieve reliable video transmission in wireless networks, solutions targeted at different network layers have been proposed, including the selection of appropriate physical layer mode, MAC layer retransmission, packet size optimization, etc.

In the prior art, a cross-layer protection strategy for video unicast in WLANs was proposed by jointly adapting MAC retransmission limit, application layer forward error correction (FEC), packetization and scalable video coding. This strategy is not applicable or appropriate for multicast. In the multicast scenario, the channel conditions for different users are heterogeneous, which means the receivers of the same video session may experience different channel conditions at the same time. Adaptation decisions cannot be made based on a single user's feedback. Furthermore, for multicast packets, the IEEE 802.11 WLAN link layer does not perform retransmissions.

In other art, a scheme which combines the progressive source coding with FEC coding was proposed for video multicast over WLANs. That work also addressed the problem at the application layer and jointly considered the source coding parameter and channel coding parameter. However, in that work, there are several drawbacks. First, the fine granularity scalability (FGS) video coder was adopted. In order to achieve fine granularity scalability, video coding efficiency is lost. Second, the scheme in that work did not consider the error resilience of the source coder. Error resilience of the source coder is also an important parameter for robust video multicast services over wireless networks. The new H.264/JVC standard is expected to dominate in upcoming multimedia services, due to the fact that it greatly outperforms the previous video coding standards. Thus, new adaptive joint source and channel coding algorithms are necessary for H.264-based wireless video multicast system.

In video multicast, every user may have different channel conditions and users may join or leave the multicast service during a session so that the user topology can change dynamically. The key issue is, therefore, to design a system to obtain overall optimality for all users or at least as many users as possible. This can be achieved by appropriately allocating available bandwidth at application layer to the source coder and FEC.

SUMMARY OF THE INVENTION

The present invention describes a joint source and channel coding scheme that dynamically allocates the available bandwidth to the source coding and FEC to optimize the overall system performance, by taking into account the user topology changes and varying channel conditions of multiple users. Furthermore, the present invention describes a channel estimation method that is based on the average packet loss rate and the variance of packet loss rate. Another aspect of the present invention is that the error resilience of the source coding and error correction of the FEC are considered as well as how the best performance in terms of received video quality can be achieved. In addition, two overall performance criteria for video multicast and their effects on individual video quality are considered. Simulations and experimental results are presented to show that the scheme of the present invention improves the overall video quality of all the served users.

A method and apparatus for estimating packet loss rate are described including calculating a real packet loss rate in a time slot at the end of the time slot, estimating average packet loss rate for a subsequent time slot, estimating variance of packet loss rate for the subsequent time slot and estimating the packet loss rate for the subsequent time slot. A method and apparatus and also described for dynamically allocating available bandwidth for video multicast including selecting an intra-frame rate, determining a packet loss rate threshold, receiving user topology information, receiving channel conditions for each user, determining an optimal operation point for encoding and transmitting video frames in a subsequent time slot, adapting dynamically quantization parameters and a forward error correction code rate, encoding the video frames using the quantization parameters and applying forward error correction code with the forward error correction code rate to data packets of the video frames to generate forward error correction packets.

BRIEF DESCRIPTION OF THE DRAWINGS

The present invention is best understood from the following detailed description when read in conjunction with the accompanying drawings. The drawings include the following figures briefly described below.

DETAILED DESCRIPTION OF THE PREFERRED EMBODIMENTS

Figure 1:
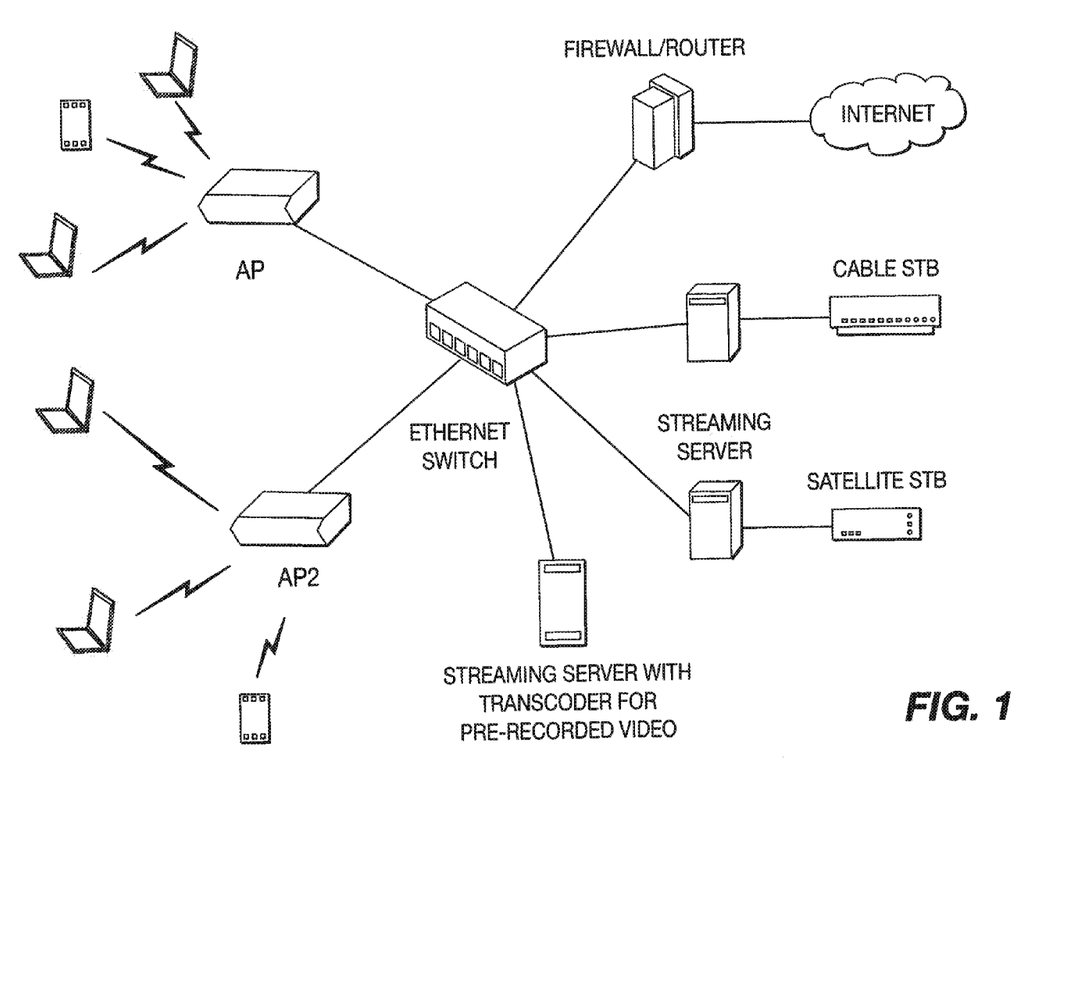
FIG. 1 is a schematic block diagram of the end-to-end architecture for video multicasting over a wireless network.

An exemplary end-to-end architecture for a wireless video multicasting system is shown in FIG. 1. The video servers are connected to the wireless access points (APs)/base stations through, for example, a high-speed Ethernet LAN. The Ethernet LAN is also connected to the Internet through a router or other broadband access mechanism. Stored video contents are transcoded, traffic-shaped and multicast to a number of clients through a wireless network by the video server. Some video servers also equip video capture and encoding cards with which live video contents, fed from cable/satellite set-top boxes or video cameras, are real-time encoded into H.264 format, traffic shaped and multicast to a number of clients. The users can view one or more video programs and simultaneously access the Internet with a wireless device. The present invention can be used for any wireless networks although an IEEE 802.11 WLAN network is used as an example.

For multicast, the IEEE 802.11 link layer does not support retransmission of lost packets. Thus, additional error correction and error resilience mechanisms are required to provide satisfactory and reliable services for users within the multicast serving area and to allow adaptation to varying user topology and varying channel conditions of multiple users in the multicast serving area. One of the effective approaches for wireless multicast operation is to jointly use FEC codes at the application layer and the error resilience redundancy in video coding. For example, Reed-Solomon (RS) codes for application-layer FEC can be used because the RS code is a maximum distance code with high error correction capability. The RS coding is applied across the video packets. Other FEC codes can also be used.

When video is streamed over a lossy packet network, such as wireless network, the distortion D of the decoded video at a receiver depends both on the quantization incurred at the encoder and the channel errors that occurred during transmission and consequent error propagation in the decoded sequence. The former is called the source-induced distortion, denoted by $D_s$, and the latter is called the channel-induced distortion and denoted, $D_c$. The total distortion D depends on $D_s$ and $D_c$.

Typically, there are multiple operating parameters from which the source encoder can choose, including the quantization parameter (QP) and the intra-frame rate (the frequency that a frame is coded using the intra-mode, without prediction from a previous frame, denoted as β), etc. The encoding parameters are denoted collectively as A. The encoding parameters A determine the source-induced distortion $D_s$ as well as the source coding rate $R_s$. QP regulates how much spatial detail is retained in the compressed video. Smaller QP introduces lower $D_s$ with higher $R_s$. Intra-frame rate affects the error resilience of the video stream. More periodically inserted intra-coded frames make the coded bit stream less sensitive to channel errors. However, correspondingly, that leads to a higher source rate for almost the same source distortion.

The channel distortion $D_c$ depends both on A and channel error characteristics. In a simplified version, the channel error characteristics are characterized by the residual packet loss rate P, which depends on the raw packet loss rate $P_e$, and the FEC rate r.

For a given total target bit rate $R_{tot}$, a higher value of the source coding rate $R_s$ will reduce the channel rate $R_c$ allocated to FEC coding, hence channel-induced distortion $D_c$ may increase. For a particular user with a given channel condition or packet loss rate $P_e$, there is an optimal operation point $S^*=(A^*, r^*)$ at which the total distortion D is minimal.

To achieve the optimal operation point $S^*$ for a specific user, the optimization problem can be formulated as follows.

$$D_{opt} = \min D(S, P_e)$$

subject to $$R_s + R_c \leq R_{tot} \quad (1)$$

Since more intra-coded frames result in higher $R_s$ without changing $D_s$, the bit rate $R_{si}$, which is induced by inserting more intra-coded frames, is separated from the source rate $R_s$, and the minimum source bit rate $R_{sb}$, the source rate with only one intra-coded frame per group of pictures (GOP), is defined. The bit rate used for error resilience and error correction $R_r$ depends on $R_c$ and $R_{si}$.

$$R_r = R_{si} + R_c$$

$$R_{tot} = R_{sb} + R_r \quad (2)$$

Given QP, an optimization problem can be formulated to minimize the channel distortion $D_c$.

$$D_{c,opt} = \min D_c(\beta, r)$$

subject to $$R_{si} + R_c \leq R_r \quad (3)$$

Given a video sequence and the total target bit rate $R_{tot}$, the optimal operation point S* for a specific user could be obtained by exhaustive searching from all feasible S that satisfy the constraints in equation (1). Other methods can also be used to solve equation (1) for the optimal operation point.

In the simulations performed, the "Kungfu" video sequence in SD (720×480) resolution was encoded using the latest JM9.6 H.264 coder. Each Group of Frames (GOF) has the duration of T=2 seconds and comprises 48 frames. The first 240 frames were encoded and the encoded video sequence was looped 30 times to generate a 5 minute video sequence. QP is changed from 34 to 39 and the intra-frame rate was changed from four frames per GOF to one frame per GOF to obtain different source coding rates. The corresponding source coding rate ranges from 599 kbps to 366 kbps. Given $R_{tot}$, QP and β, all remaining bandwidth besides source coding rate is allocated to $R_c$, hence r is determined.

To simulate the burst packet loss in a wireless network, a two-state Markov model characterized by the average packet loss rate (PLR) and the average burst length (ABL) is used in the simulations. To simulate the fluctuation of channel conditions, four different channel conditions are modeled using the Markov model with different parameters (PLR,ABL): A(0.01,1.1), B(0.05,1.2), C(0.1,1.5), D(0.2,2.0). The target bandwidth $R_{tot}$ is set to be 600 kbps. On the receiver side, "motion copy" is chosen as the error-concealment strategy integrated in a JM 9.6 H.264 decoder.

Figure 2:
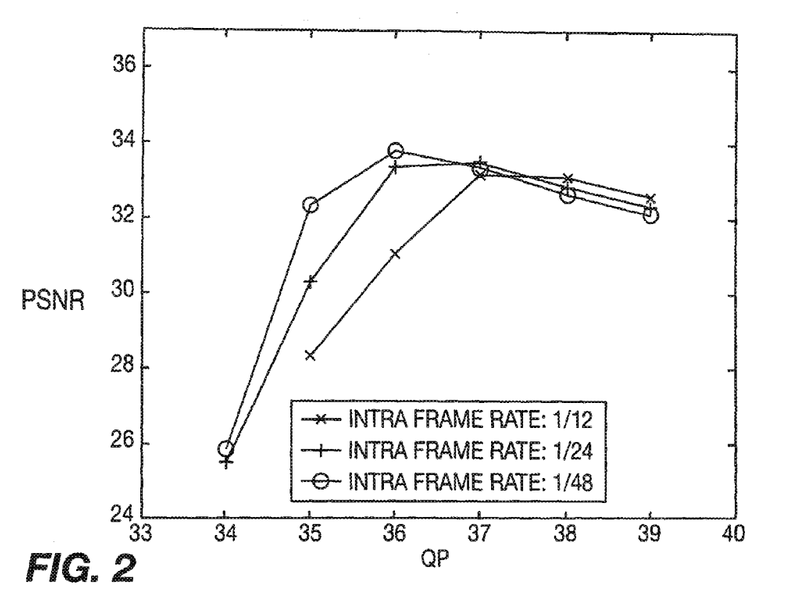
FIG. 2 is a comparison of the effect of the intra-coded frames and the FEC on video quality.

FIG. 2 shows the effect of the intra-frame rate and FEC rate on video quality. QP is varied from 34 to 39 on the x-axis, and the corresponding video quality in terms of average frame Peak Signal-to-Noise Ratio (PSNR) is plotted on the y-axis. Different curves represent different β. From the figure it can be seen that when QP is small, smaller β and corresponding larger r introduce higher PSNR, but when QP is large, video qualities for different β are similar.

These observations can be explained as follows: when FEC coding with bit rate $R_c$ is not sufficient to recover all packet loss, it will get more decoding gain when more bit rate is allocated to $R_c$ than to $R_{si}$. It indicates that the video quality is very sensitive to the packet loss. It is more efficient to prevent packet loss rather than to stop error propagation when packet loss occurs. On the other hand, when $R_r$ is high, no matter what β is, FEC coding always recovers all packet loss, hence $D_c$=0 and the overall video quality only depends on the source coding.

Thus, it can be concluded that in a multicast video application the FEC rate r is a more dominant factor for video quality than the intra-frame rate β. It is more efficient to allocate $R_r$ to $R_c$ than to $R_{si}$.

Figure 3:
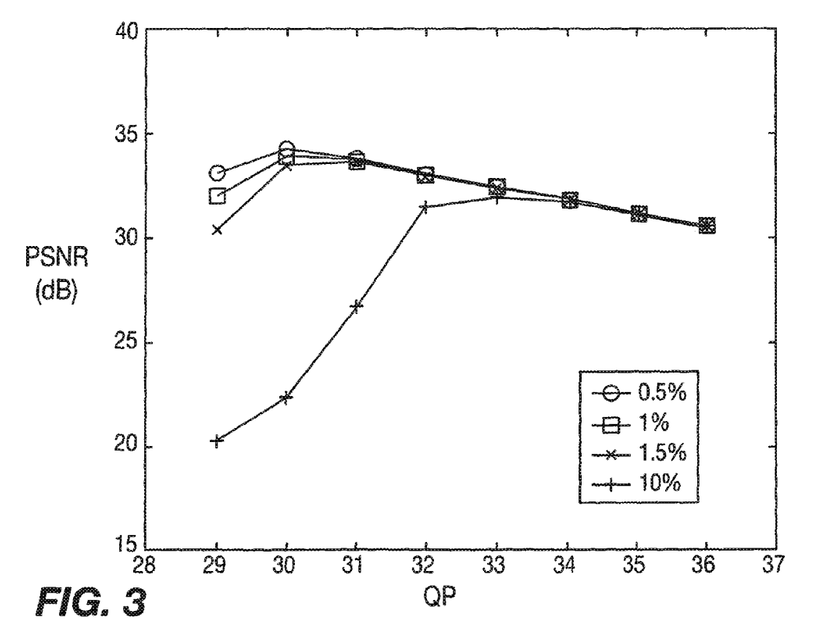
FIG. 3 shows the video quality under different operation points for different channel conditions.

FIG. 3 shows the optimal operation points for different channel conditions. QP is plotted on the x-axis, and video quality in terms of PSNR is plotted on the y-axis. The video qualities for different channel conditions are indicated by the different curves. For different channel conditions, the optimal operation points are different. When channel conditions are poor, the optimal QP value is small, correspondingly there is more bit rate allocated to FEC coding for channel protection. When channel conditions are good, it is wasteful to add a lot of redundancy for FEC. Thus, a smaller QP should be used to reduce source coding distortion. Also, it should be noted that for particular channel conditions, the video quality is quite different using different QP. The video quality degradation between a particular QP chosen arbitrarily and optimal QP is noticeable, especially when channel conditions are poor. It is crucial to choose a suitable operation point, which is adaptive to channel conditions.

In a multicast scenario, the same video signal is transmitted to multiple users by the access point (AP)/base station. Different users have different channel conditions and receiving quality. An optimal selection of source and channel coding for one user may not be optimal for other users. It is desirable to optimize some composite performance criteria for all the users of the same video session in the desired multicast service area under the total rate constraint. However, the optimal operation point is dependent on the overall performance criterion.

In a wireless environment, channel conditions for each user are not always stable. In order to dynamically make adaptation decisions at transmission time, the packet loss rate at the receiver side should be known. This can be determined by means of periodic feedback from receivers. The receivers/user terminals predict their packet loss rates in next time slots based on their previous packet loss rates and send the feedback to video streaming server. Based on the estimated channel conditions of multiple receivers, the video streaming server determines the operation point for next set of frames. A channel estimation algorithm that is based on the average packet loss rate and the variance of packet loss rate is described. Finally, an adaptive joint source and channel coding algorithm for video multicast over a wireless network is described.

Two performance criteria are considered: (1) maximizing the weighted average of the video quality (in terms of average frame Peak Signal-to-Noise Ratio or PSNR) of all users in a multicast group (called weighted average criterion) (2) minimizing the maximum individual video quality degradation due to multicast among the served users from their own optimal video quality (called minimax degradation criterion).

The weighted average criterion is defined as:

$$Q_{opt} = \max\left\{\left[\sum_{k=1}^{N} W(k) Q_k(S, P_{e,k})\right]\right\} \quad (4)$$

where N is the number of users in the multicast group, $Q_k$ (S, $P_{e,k}$) is the individual video quality of user k, W(k) is the weight function for user k, satisfying $$\sum_{k=1}^{N} W(k) = 1 \quad (5)$$

W(k) depends on the channel condition of user k. One simple but practical form of W(k) is $$W(k) = \begin{cases} \frac{1}{N_g} & P_{e,k} \leq P_{th} \\ 0 & P_{e,k} > P_{th} \end{cases} \quad (6)$$

where $P_{e,k}$ is the packet loss rate of user k, $P_{th}$ is the threshold of packet loss rate, and $N_g$ is the number of users with $P_{e,k}$ less than or equal to $P_{th}$. The form of W(k) is not limited to equation (6). This criterion averages the individual performance over the users in the desired multicast service area with reasonable channel conditions and ignores the users with very bad channel conditions.

A criterion that minimizes the maximum performance degradation due to multicast among multiple users has been proposed in the prior art. Different from the prior art, the criterion of the present invention requires that a user must meet a minimum requirement for receiving channel quality if it is to be served. This prevents a user with very bad channel conditions to cause dramatic quality degradation to/for other users. The minimax degradation criterion is defined as follows.

$$Q_{opt} = \min\{\max[W(k)(Q_{opt,k}(P_{e,k}) - Q_k(S, P_{e,k}))]\} \quad (7)$$

where k=1, 2, 3, ... N and N is the total number of users in a multicast group, $Q_{opt,k}(P)$ is the maximum video quality of user k (which can be achieved by selecting the operation point to only optimize user k), and $Q_k(S, P_{e,k})$ is the actual received video quality of user k when S is selected as the operation point in the multicast session.

The weight function can be of different forms. One possible form is $$W(K) = \begin{cases} 1 & P_{e,k} \leq P_{th} \\ 0 & P_{e,k} > P_{th} \end{cases} \quad (8)$$

Another form is $$W(K) = \begin{cases} 1 & Q_{opt,k} \geq Q_{th} \\ 0 & Q_{opt,k} < Q_{th} \end{cases} \quad (9)$$

where $Q_{th}$ is the threshold of the optimal video quality for a user. If a user is subject to very bad channel conditions, i.e. its packet loss rate is greater than the packet loss rate threshold or its own optimal video quality is less than the video quality threshold, this user is not considered when determining the optimal operation point for the multicast session. Given each user's individual channel conditions, this criterion minimizes the maximum value of degradation between the received performance and the expected optimal performance among the users in the desired multicast serving area. The minimax degradation criterion attempts to equalize the degradation of video quality among the served users from their individual optimal operation points. Note that other forms of weight functions can also be used.

In order to see the effects of these two criteria on optimal operation point selection, the simulation platform similar to that described above was used. In this experiment, a video stream is multicast to 100 users, and every user experiences one of the four different channel conditions A, B, C, D illustrated above in each 30 second period. For a new 30 second period, each user will be assigned to a new channel condition with the average packet loss rate $P_a$, $P_b$, $P_c$, $P_d$. The entire test time is 10 minutes.

Here, the users with $P_a$, $P_b$, $P_c$ and $P_d$ are chosen as follows:

TABLE 1

| User percentage of channel conditions | | | |
|---|---|---|---|
| A | B | C | D |
| 70% | 20% | 5% | 5% |

To compare the two criteria fairly, the threshold $P_{th}$ in equations (6) and (8) should be same for both criteria. Without loss of generality, threshold $P_{th}$=0.3, hence all users are considered.

Figure 4:
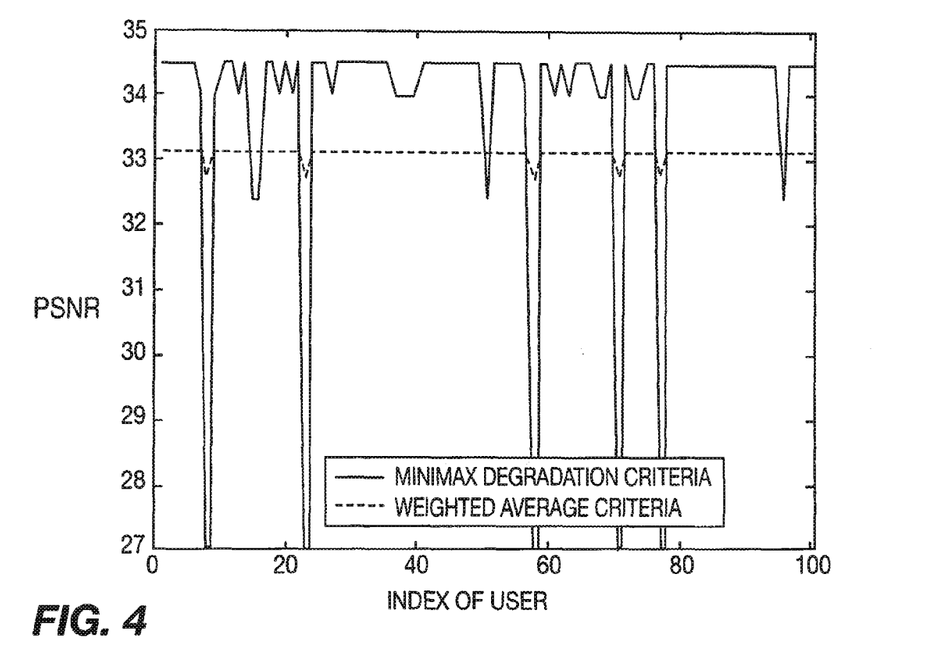
FIG. 4 shows the effect of different criteria on video quality for different users in a multicast group in a particular time slot.

FIG. 4 is a plot of the video quality for all users at a chosen time slot based on the selected optimal operation points using different criteria. The x-axis is the index of users, and y-axis is the video PSNR for each user. The solid line represents the minimax degradation criterion and dotted line represents the weighted average criterion. From FIG. 4, it can be seen that based on the minimax degradation criterion, the individual video qualities of different users tend to be consistent with each other no matter which channel conditions the users are experiencing. However, using the weighted average distortion criterion, there is a much larger variance of video quality between different users. In the meantime, the average video PSNR among all users based on the weighted average distortion criterion is higher than that based on minimax degradation criterion.

In addition to the heterogeneity of channel conditions among different users, the channel condition of an individual user is varying. It is also interesting to see the individual behavior for a particular user using different criteria.

Figure 5:
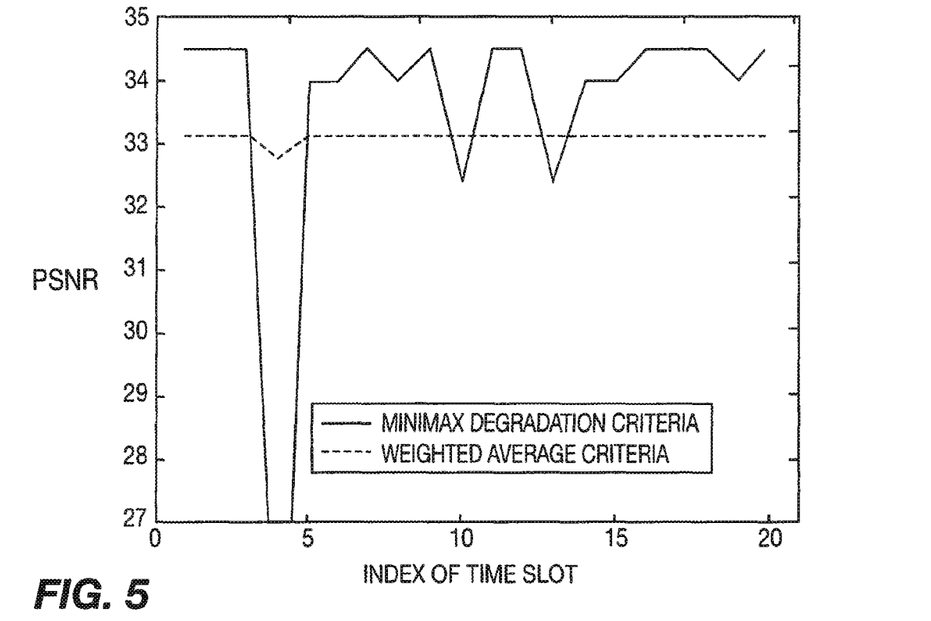
FIG. 5 shows the effect of different criteria on video quality for a particular user.

FIG. 5 is a plot of the individual video quality for one particular user in different time slots. It is not difficult to see that the individual video quality is more stable using minimax degradation criterion than using weighted average distortion criterion. The stability of video quality is appealing for subjective video quality.

Thus, it can be concluded that minimax degradation criterion tends to sacrifice the overall average video quality to achieve a smaller video quality variance between different users with different channel conditions, and between different time slots of the same user with varying channel condition, while weighted average distortion is mainly concerned with the average video quality.

Due to the heterogeneity and variation of channel conditions of receivers in a multicast group, for high bandwidth efficiency and high reliability, it is desirable that the video streaming server dynamically make source coding and channel coding adaptation decisions at transmission time according to the most recent estimation of packet loss rate for all receivers.

Receivers predict/estimate the packet loss rates in next time slots based on their previous packet loss rates and send periodic feedback to video streaming server. Based on the estimated channel conditions, the video streaming server determines the operation point for next set of video frames. A packet loss estimation method considering both average packet loss rate in each time slot and variance of packet loss rate is described, which can be formulated as follows:

$$D = P_m(t) - P_a(t)$$

$$P_a(t+1) = P_a(t) + a*D$$

$$P_v(t+1) = P_v(t) + b*(|D| - P_v(t))$$

$$P(t+1) = P_a(t+1) + c*P_v(t+1) \quad (10)$$

where $P_m(t)$ is the real packet loss rate in last time slot t, P(t+1) is the estimated packet loss rate for time slot t+1, $P_a(t)$ and $P_v(t)$ are estimated average packet loss rate and variance of packet loss rate respectively, D is the difference between the real packet loss rate in time slot t and the estimated average packet loss rate, a and b are two design parameters between 0 and 1, c is another design parameter with a non-negative value.

Parameters a, b are selected based on the dependence of channel conditions between two consecutive time slots. If the channel conditions change slowly, larger a and b values are chosen, and vice versa. Note that $P_a(t+1)$ is merely the expectation of average packet loss rate in next time slot, it may not represent the real packet loss rate accurately. However, the video quality is sensitive to the packet loss, the underestimate of packet loss rate will induce a dramatic degradation of video quality. Thus, $P_a(t+1)$ is corrected by adding $P_v(t+1)$ to avoid the underestimation. Obviously, this may yield a larger estimated packet loss rate, and accordingly a larger QP will be chosen. Since the packet loss has more impact on the video quality than QP, it would be better to overestimate packet loss. Parameter c is used to determine how conservatively the estimation is done to avoid underestimate.

Figure 6:
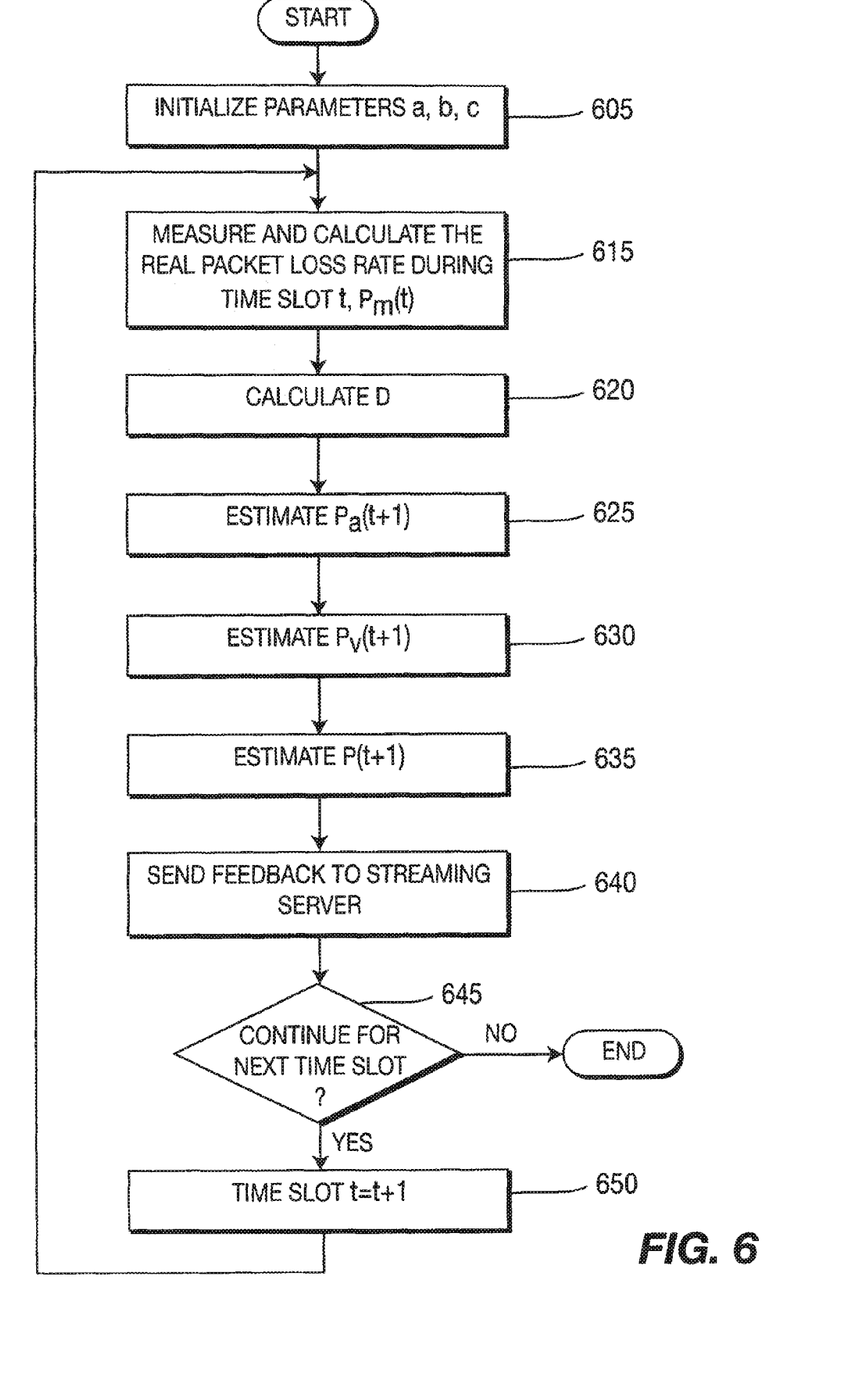
FIG. 6 is a flowchart of the packet loss estimation method of the present invention.

FIG. 6 is a flowchart of the method for estimating packet loss rate at a user/client terminal. At 605 parameters a, b and c are initialized. The real packet loss rate during time slot t is measured and calculated at the end of the time slot t at 615. The difference between the real packet loss rate in time slot t and the estimated average packet loss rate in time slot t is calculated at 620. The average packet loss rate for the next time slot t+1 is estimated at 625. The variance of the packet loss rate for the next time slot is estimated at 630 and the estimated packet loss rate for time slot t+1 (the next time slot/a subsequent time slot) is estimated at 635. The estimated packet loss rate for the next time slot t+1 is sent to the video streaming server at 640. A determination is made as to whether this procedure continues for the next time slot at 645. If not, the procedure ends. If yes, the time slot index is increased at 650. This method then repeats for the next time slot.

Figure 7:
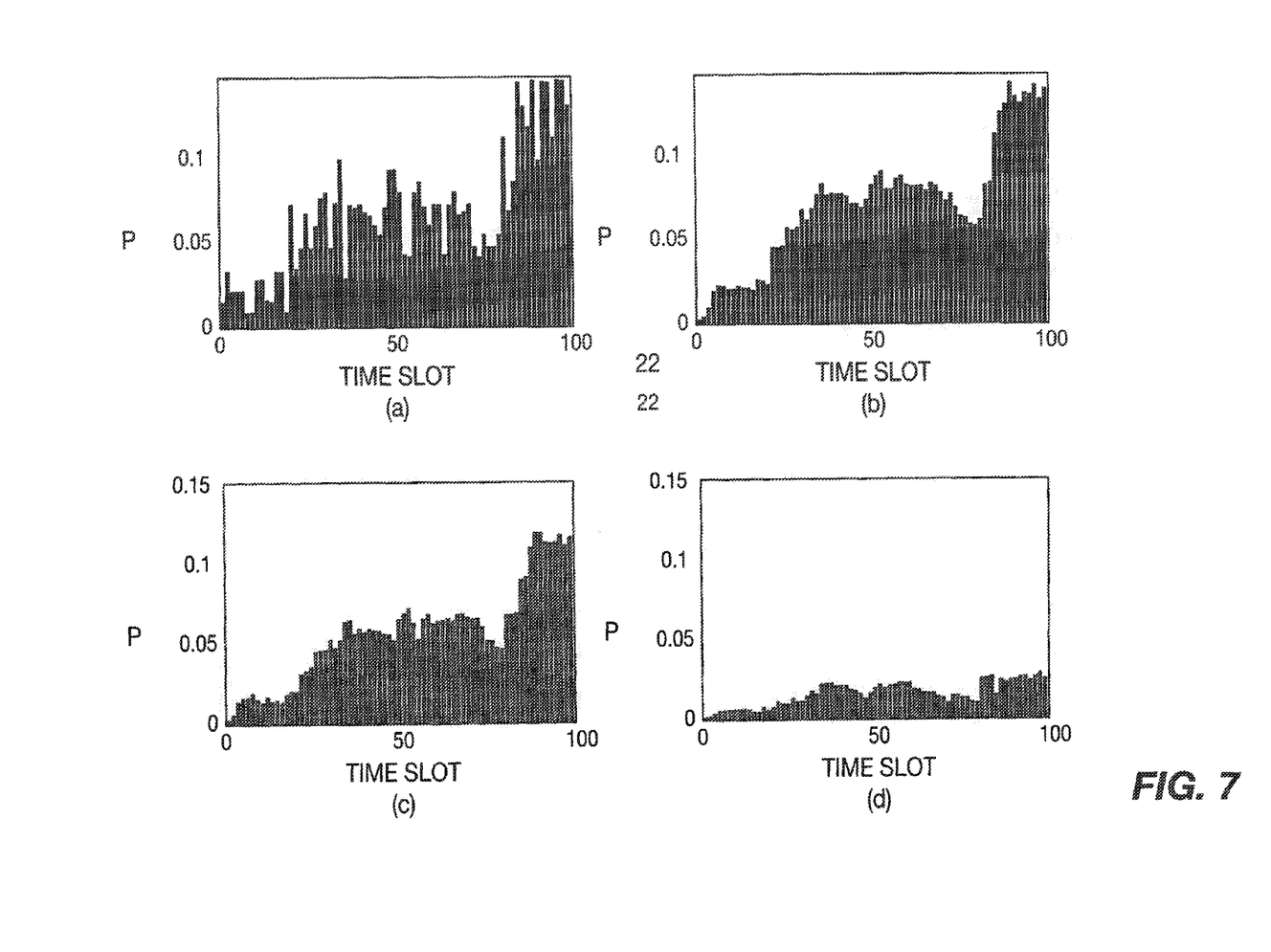
FIG. 7 shows (a) the real packet loss rate, (b) estimated packet loss rate, (c) average estimated packet loss rate and (d) estimated variance of packet loss rate in each time slot.

FIG. 7 plots (a) the real packet loss rate, (b) estimated packet loss rate, (c) average estimated packet loss rate and (d) estimated variance of packet loss rate in each time slot when feedback time slot is 4 seconds and the parameters are set to be a=¼, b=⅛, c=1. FIG. 7 shows that estimated packet loss rate in each time slot follows the same trend with the real packet loss rate and has a fast response when real packet loss changes dramatically. Moreover, in most cases, the real packet loss rate is smaller than the corresponding estimated packet loss rate.

It should be noted that the packet loss rate estimation approach is a more general case of averaging packet loss estimation of the prior art, which only considers the average of packet loss rate. The packet loss rate estimation algorithm combines both the mean and the variance to obtain a conservative estimation. When c=0, the packet loss rate estimation algorithm degrades to averaging packet loss prediction (shown in (c) in FIG. 7).

Since it is more efficient for recovery of lost data to add more FEC than to add more intra-coded frames, minimum β is used where there is only one intra-coded frame per GOP. Given QP and β, source rate $R_s$ is determined, and all remaining bandwidth $R_{tot} - R_s$ is allocated to FEC coding. The video source encoder or video transcoder should be capable of changing QP in real time during a multicast video session in order to achieve optimal overall performance. The rate-distortion curves (similar to those in FIG. 3) for a particular video under different channel conditions are calculated beforehand or estimated online. Receivers need to sense their channel conditions, predict their future channel conditions and send feedback of their estimated packet loss rates to the AP/base station.

Figure 8:
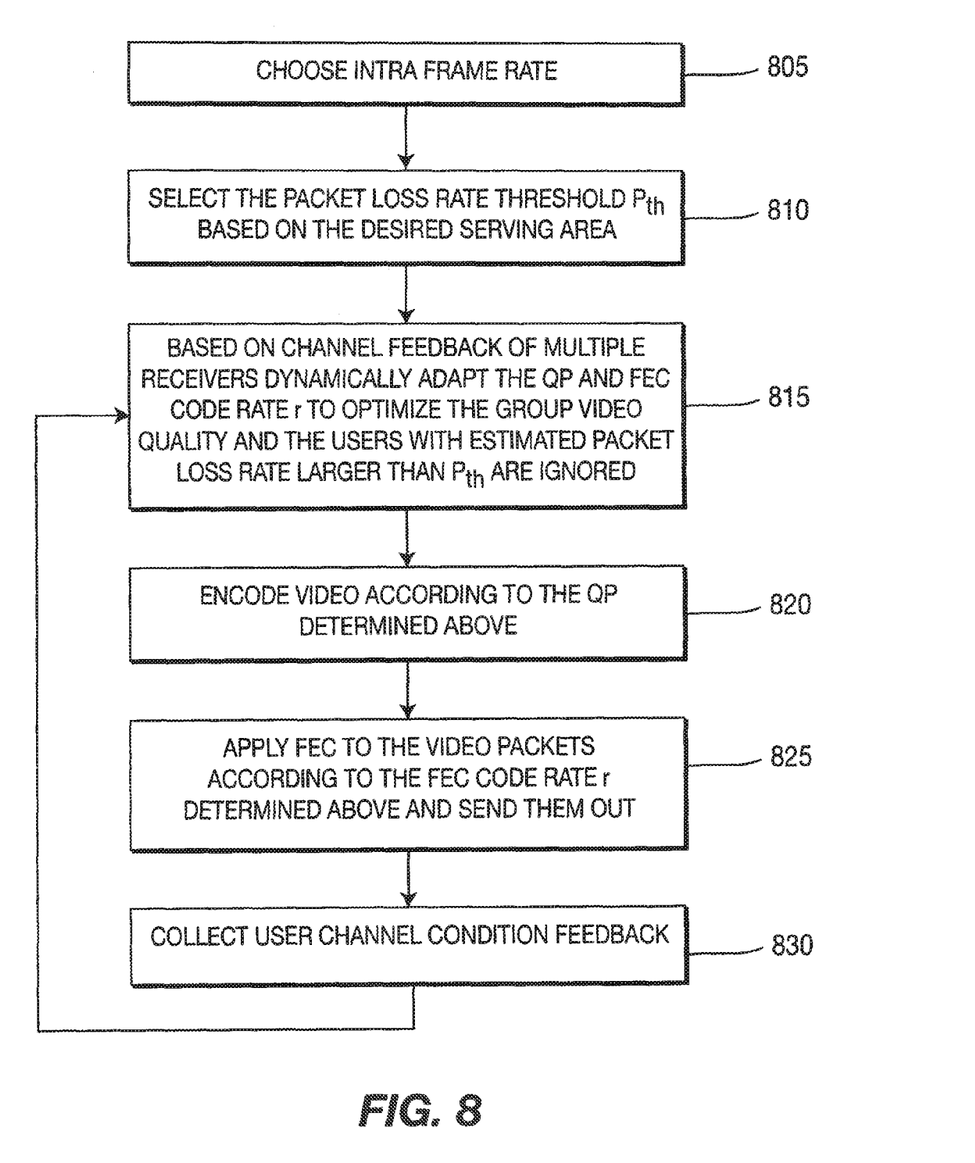
FIG. 8 is a flowchart of the adaptive joint source and channel coding scheme in accordance with the principles of the present invention.

Referring to FIG. 8, the joint adaptation of source and channel coding scheme could be achieved using the following procedure:

Choose intra frame rate at 805.
Select the packet loss rate threshold $P_{th}$ based on the desired serving area at 810.
At 815, based on varying user topology and varying channel conditions fed back by multiple receivers (each receiver determines its own packet loss rate in a time slot and estimates the packet loss rate for next time slot and sends feedback to the video streaming server), the system dynamically adapts QP and FEC code rate r to optimize the group video quality over all the users in the desired multicast serving area based on the total target bit rate. The users with packet loss rate larger than $P_{th}$ are not considered.
At 820, encode (or transcode) the video using the QP determined in the previous step.
Apply FEC code to the data packets to generate the FEC packets and send the data packets and FEC packets out in multicast to the users at 825. The FEC rate r is determined in the previous step.
Collect user channel condition feedback at 830 and go to 815.

Figure 9:
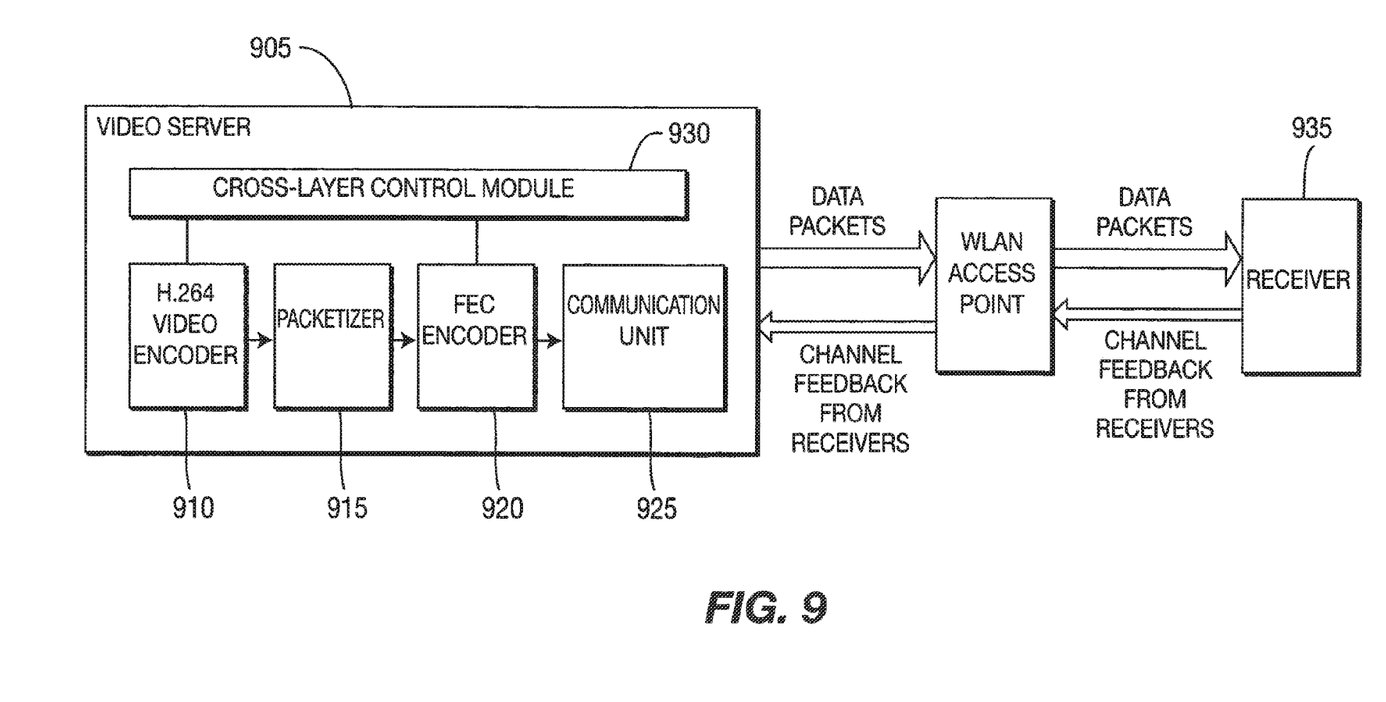
FIG. 9 is a schematic diagram illustrating a video server and its connections in the network system in accordance with the present invention.
Figure 9A:
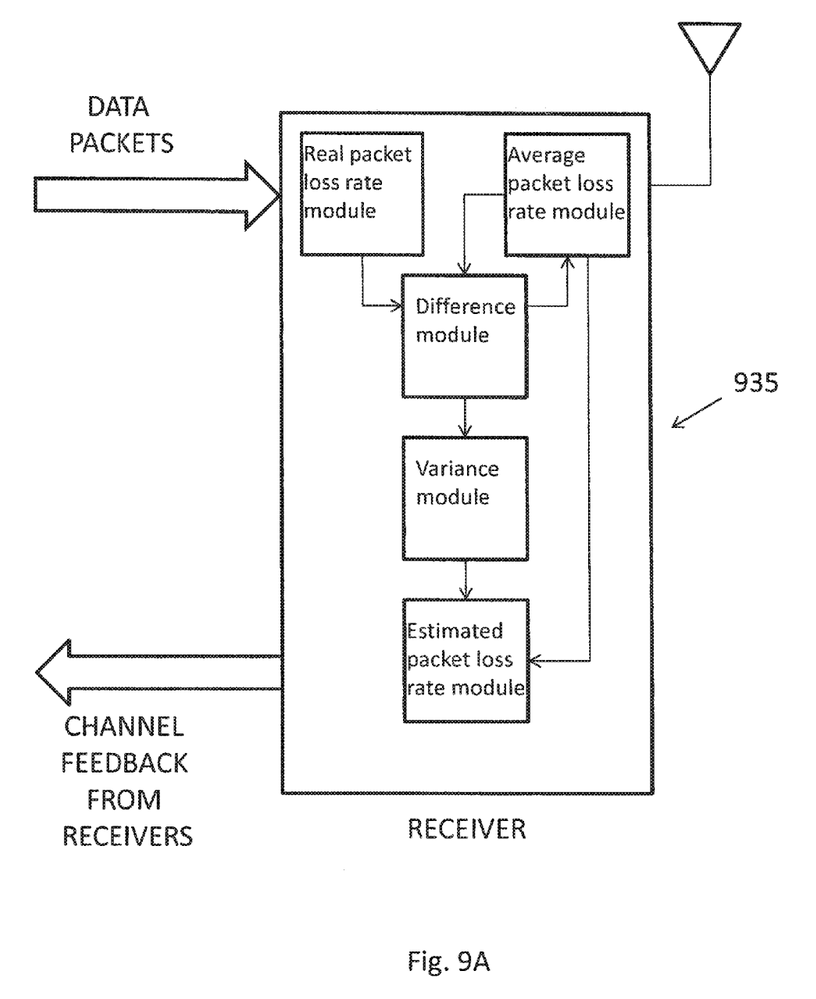

Referring to FIG. 9, a system level implementation aspect of the invention is described. Video server 905 includes, among other components, an H.264 video encoder 910, packetizer 915, forward error correction (FEC) encoder 920, communication unit 925 and cross-layer control module 930. The H.264 video encoder 910 encodes the raw video into H.264 encoded video bit stream. The packetizer 915 generates the packets from the encoded bit stream. The FEC encoder 920 applies cross-packet FEC coding to the packets. The communications unit 925 sends and receives the packets. The cross-layer control module 930 controls H.264 video encoder 910 and forward error correct (FEC) encoder 920 within the video server 905. The wireless video receivers 935 feedback their channel status to the cross-layer control module 930. Based on the estimated channels conditions of multiple receivers of the video session, the cross-layer control module 930 determines and adapts the source coding parameters (e.g. QP) and application layer FEC parameters (e.g. r).

Simulations were performed for the adaptive joint source and channel coding scheme for video multicast over a WLAN. A video stream is multicast to 10 users, each of whom experiences one of four different channel conditions A, B, C, D as indicated above in a 30 second period. For a subsequent 30 second period, each user will be assigned new channel conditions with the average packet loss rates $P_a$, $P_b$, $P_c$, $P_d$. The entire test time is 5 minutes. Consider 5 sets of $P_a$, $P_b$, $P_c$, $P_d$ (see Table 2), which represent 5 different overall channel conditions of the whole multicast group. The performance of the scheme of the present invention in different overall channel conditions is considered.

TABLE 2

The user percentage of different channel conditions

| A | B | C | D |
|---|---|---|---|
| 50% | 30% | 15% | 5% |
| 40% | 30% | 20% | 10% |
| 30% | 30% | 30% | 10% |
| 20% | 30% | 30% | 20% |
| 10% | 20% | 40% | 30% |

The scheme/method of the present invention is compared with two simpler schemes, both of which use application layer FEC coding for error correction.

Scheme 1: QP is chosen arbitrarily and fixed during the entire test time.

Scheme 2: QP is fixed during the entire test time, but this scheme considers the overall average packet loss rate of each user. In this scheme, no feedback is employed. The video streaming server estimates the overall channel condition of each receiver at the beginning of the video session and sets up QP which can be obtained by exhaustive searching using the pre-stored rate-distortion curves and the estimated packet loss rate of entire test time of each user. This scheme adapts the channel conditions of receivers to a degree, but it ignores the instability of channel conditions and changes in network topologies.

Figure 10:
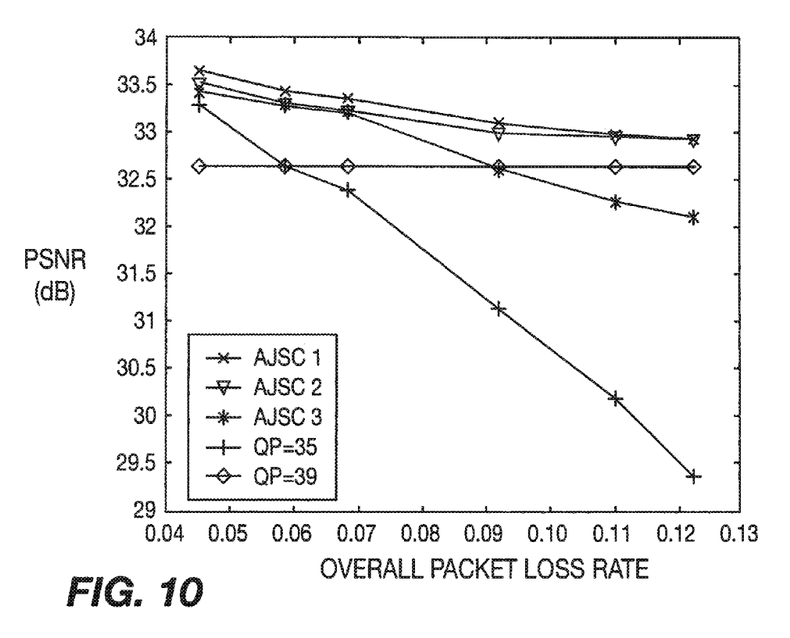
FIG. 10 shows a comparison of different schemes in terms of average video quality.

FIG. 10 shows the performance comparison between the schemes discussed above. AJSC 1 is the adaptive joint source and channel coding scheme based on weighted average distortion criterion. AJSC2 is the adaptive joint source and channel coding scheme based on minimax degradation criterion. AJSC3 is 'scheme 2' which at the session start selects the QP and r based on the overall packet loss rates of receivers. Two more curves are plotted for the fixed QP case (Scheme 1), QP=35 and QP=39. The x-axis is the overall packet loss rate of all users in the multicast group during the entire test time with different sets of $P_a$, $P_b$, $P_c$, $P_d$ (see Table 2). The y-axis is the overall average video quality of all users in the multicast group in terms of PSNR.

From FIG. 10, it can be seen that AJSC1 provides the best overall performance in context of average video quality. AJSC2 outperforms other schemes except AJSC1. When overall channel conditions are poor, the curves of AJSC1 and AJSC2 converge. This can be explained as: AJSC2 tends to allocate more bandwidth for channel coding when determining the optimal operation point than AJSC1, and the decision is less sensitive to channel conditions in order to generate more stable individual video quality. As overall channel conditions become worse, for weighted average criterion, a higher QP needs to be chosen corresponding to more protection to combat the packet loss. Thus, when overall channel conditions are bad, both of the schemes choose similar optimal operation points, which result in similar performances. Another interesting observation is when QP is 39, the curve is almost constant. When QP is 39, the bit rate allocated to FEC can recover almost all packet loss no matter what channel conditions a receiver experiences. Thus the overall video quality is the source coding video quality. This overall video quality with QP equal to 39 can be considered as the lower bound of performance of a scheme. If the performance of a scheme is below the lower bound in some channel conditions, the scheme can be considered ineffective.

Figure 11:
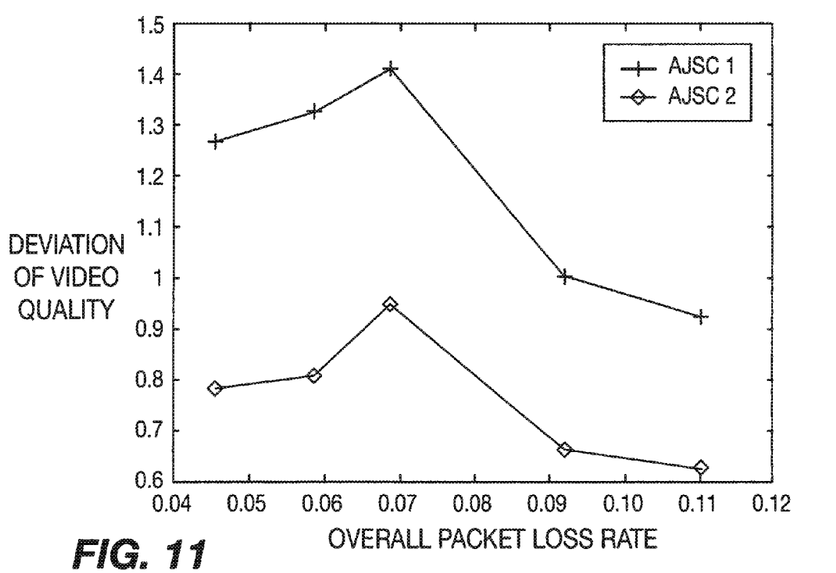
FIG. 11 is a comparison of different schemes in terms of standard deviation of video quality.

FIG. 11 plots the deviation of video quality in the multicast group during the entire test time. The deviation considers both difference of video qualities between different users in the same time slot and the instability of video quality of individual user in different time slots. As expected, the video quality is more stable when minimax degradation criterion is adopted.

It is to be understood that the present invention may be implemented in various forms of hardware, software, firmware, special purpose processors, or a combination thereof. Preferably, the present invention is implemented as a combination of hardware and software. Moreover, the software is preferably implemented as an application program tangibly embodied on a program storage device. The application program may be uploaded to, and executed by, a machine comprising any suitable architecture. Preferably, the machine is implemented on a computer platform having hardware such as one or more central processing units (CPU), a random access memory (RAM), and input/output (I/O) interface(s). The computer platform also includes an operating system and microinstruction code. The various processes and functions described herein may either be part of the microinstruction code or part of the application program (or a combination thereof), which is executed via the operating system. In addition, various other peripheral devices may be connected to the computer platform such as an additional data storage device and a printing device.

It is to be further understood that, because some of the constituent system components and method steps depicted in the accompanying figures are preferably implemented in software, the actual connections between the system components (or the process steps) may differ depending upon the manner in which the present invention is programmed. Given the teachings herein, one of ordinary skill in the related art will be able to contemplate these and similar implementations or configurations of the present invention.

The invention claimed is:

1. A method for dynamically allocating available bandwidth in a wireless network for video multicast, said method comprising:
   selecting an intra-frame rate;
   determining a packet loss rate threshold based on a desired serving area;
   receiving user topology information;
   receiving channel conditions for each receiver;
   determining target bit rate for encoding and transmitting video frames in a subsequent time slot;
   adapting quantization parameters and a forward error correction code rate based on said received channel conditions and said received user topology information, wherein said receivers having a packet loss rate greater than said packet loss rate threshold are ignored;
   encoding said video frames based on said quantization parameters and said intra-frame rate, wherein said quantization parameters and said forward error correction code rate are based on a target bit rate; and
   applying forward error correction code with said forward error correction code rate to data packets of said video frames to generate forward error correction packets.

2. The method according to claim 1, further comprising transmitting said data packets and said forward error correction packets in multicast.

3. The method according to claim 1, further comprising:
   receiving updated channel conditions for each said receiver;
   receiving updated user topology information; and
   repeating said determining act, said adapting act; said encoding act, and said applying act.

4. The method according to claim 1, wherein said determining act is based on one of a weighted average distortion criterion and a minimax degradation criterion, wherein said weighted average distortion criterion maximizes the weighted average of overall video quality in a multicast group, and wherein said minimax degradation criterion minimizes a maximum performance degradation due to multicast wherein a user's channel conditions meet a minimum quality for service.

5. An apparatus for dynamically allocating available bandwidth in a wireless network for video multicast, comprising:
   means for selecting an intra-frame rate;
   means for determining a packet loss rate threshold based on a desired serving area;
   means for receiving user topology information;
   means for receiving channel conditions for each receiver;
   means for determining target bit rate for encoding and transmitting video frames in a subsequent time slot;
   means for adapting quantization parameters and a forward error correction code rate based on said received channel conditions and said received user topology information, wherein said receivers having a packet loss rate greater than said packet loss rate threshold are ignored;

means for encoding said video frames based on said quantization parameters and said intra-frame rate, wherein said quantization parameters and said forward error correction code rate are based on a target bit rate;

means for setting a forward error correction rate; and means for applying said forward error correction code with said forward error correction code rate to data packets of said video frames to generate forward error correction packets.

6. The apparatus according to claim 5, further comprising means for transmitting said data packets and forward error correction packets in multicast.

7. The apparatus according to claim 5, further comprising:
means for receiving updated channel conditions for each said receiver; and
means for receiving updated user topology information.

8. The apparatus according to claim 5, wherein said means for determining functions based on one of a weighted average distortion criterion and a minimax degradation criterion, wherein said weighted average distortion criterion maximizes the weight average of overall video quality in a multicast group, and wherein said minimax degradation criterion minimizes a maximum performance degradation due to multicast wherein a user's channel conditions meet a minimum quality for service.

9. The apparatus according to claim 5, wherein said apparatus is a video server.

10. An apparatus for dynamically allocating available bandwidth in a wireless network for video multicast, comprising:
a cross-layer control module, said cross-layer control module selecting an intra-frame rate;
said cross-layer control module determining a packet loss rate threshold based on a desired serving area;
a communications unit, said communications unit receiving user topology information;
said communications unit receiving channel conditions for each receiver;
said cross-layer control module determining target bit rate for encoding and transmitting video frames in a subsequent time slot;
said cross-layer control module adapting quantization parameters and a forward error correction code rate based on said received channel conditions and said received user topology information, wherein said receivers having a packet loss rate greater than said packet loss rate threshold are ignored;
a video encoder, said video encoder encoding said video frames based on said quantization parameters and said intra-frame rate, wherein said quantization parameters and said forward error correction code rate are based on a target bit rate, said video encode in communication with said cross-layer control module;
said cross-layer control module setting a forward error correction rate; and
a forward error correction encoder, said forward error correction encoder applying said forward error correction code with said forward error correction code rate to data packets of said video frames to generate forward error correction packets, said forward error correction encoder in communication with said cross-layer control module.

11. The apparatus according to claim 10, wherein said communications unit transmits said data packets and forward error correction packets in multicast.

12. The apparatus according to claim 10, wherein said communications unit:
receives updated channel conditions for each said receiver; and
receives updated user topology information.

13. The apparatus according to claim 10, wherein said cross-layer control module operates based on one of a weighted average distortion criterion and a minimax degradation criterion, wherein said weighted average distortion criterion maximizes the weight average of overall video quality in a multicast group, and wherein said minimax degradation criterion minimizes a maximum performance degradation due to multicast wherein a user's channel conditions meet a minimum quality for service.

14. The apparatus according to claim 10, wherein said apparatus is a video server.

* * * * *